United States Patent [19]

Kasaya et al.

[11] Patent Number: 4,784,178

[45] Date of Patent: Nov. 15, 1988

[54] VALVE UNIT

[75] Inventors: Masashi Kasaya; Tatsuhiko Abe, both of Higashimatsuyama, Japan

[73] Assignee: Diesel Kiki Co., Ltd., Japan

[21] Appl. No.: 948,437

[22] Filed: Dec. 31, 1986

Related U.S. Application Data

[63] Continuation of Ser. No. 706,476, Feb. 28, 1985, abandoned.

[30] Foreign Application Priority Data

Feb. 28, 1984 [JP] Japan ................................ 59-35341

[51] Int. Cl.[4] ............................................ F16K 37/00

[52] U.S. Cl. .................................. 137/554; 251/368; 29/620; 427/124; 427/126.3; 123/305

[58] Field of Search .................... 427/124, 126.3, 250, 427/255.1; 137/554; 123/305; 29/620; 251/368

[56] References Cited

U.S. PATENT DOCUMENTS

| | | | |
|---|---|---|---|
| 3,996,551 | 12/1976 | Croson | 427/124 |
| 4,091,138 | 5/1978 | Takagi et al. | 427/124 |
| 4,111,178 | 9/1978 | Casey | 123/305 |
| 4,153,518 | 5/1979 | Holmes et al. | 427/124 |
| 4,327,122 | 4/1982 | Chakupurakal | 427/520 |
| 4,374,162 | 2/1983 | Takagi | 427/250 |
| 4,414,274 | 11/1983 | Hieber | 427/124 |

*Primary Examiner*—A. Michael Chambers

*Attorney, Agent, or Firm*—Guy W. Shoup; Paul J. Winters

[57] ABSTRACT

In a valve unit having an ON-OFF switch constituted by a valve, the associated valve seat and an insulation layer, the layer is made of a compound consisting of a specific metal and a specific reaction gas and the layer is coated on the outer surface of the valve in such a way that its electrical resistance increases progressively from the inner surface closest to the valve to the outer surface destined to make contact with a guide member of the valve.

9 Claims, 2 Drawing Sheets

VALVE UNIT

This is a continuation application from application Ser. No. 706,476 filed Feb. 28, 1985 now abandoned.

BACKGROUND OF THE INVENTION

1. Field of the Invention

The present invention relates to a valve unit, and more particularly to a valve unit having an ON-OFF switch constituted by a valve and an associated valve seat.

2. Description of the Prior Art

In the prior art, to obtain an electric signal indicating the open/close state of a valve unit, valve units in which an ON-OFF switch is constituted by a valve and the associated valve seat are widely used. Such a valve unit is needed, for example, for constituting a valve unit driving circuit in which the driving pulse applied to the valve unit is corrected in response to the timing of opening/closing of the valve unit in order to make the open/close timing of the valve unit coincide with a target timing. It is also needed for constituting a fuel injection valve which is capable of producing an electric signal indicating the injection timing of fuel.

As such a valve unit, there is disclosed for example in U.S. Pat. No. 4,111,178 (corresponding to DE-OS No. 2748447) a fuel injection valve in which a mechanical switch is constituted by a needle valve and a nozzle body in order to obtain an electric signal indicating the timing of the beginning of fuel injection and the timing of the end of fuel injection in response to the movement of the needle valve. In the disclosed fuel injection valve, a nozzle body and a needle valve smoothly moving in the guide hole of the nozzle body are formed of an electrically conductive material and the outer surface of the needle valve is covered with a ceramic insulation film of a thickness between approximately 0.2 μm and 0.3 μm, or an insulation film formed by the sputtering of aluminum oxide.

However, when the ceramic thin film is used as the insulation film the durability is insufficient and when the insulation film formed by the sputtering of aluminum oxide is used the insulation film is liable to peel off from the outer surface of the needle valve. In either case, consequently, stable use over long periods is impossible.

SUMMARY OF THE INVENTION

It is an object of the present invention to provide an improved valve unit having an ON-OFF switch.

It is another object of the present invention to provide a valve unit having an ON-OFF switch constituted by a valve and an associated valve seat, wherein the insulated state between the valve and the guide surface of the member for guiding the valve can be maintained in stable condition over a long period with high durability.

According to one feature of the present invention, there is provided a valve unit with a switch having an electrically conductive valve which slidably moves within a guide hole defined in an electrically conductive body, and a layer formed on the peripheral surface of the valve for maintaining an electrically insulated state between the valve and the body, thereby forming a switch for electrically connecting the body and the valve when the valve is seated on an associated valve seat formed in the body, characterized in that the layer is made of compound formed by reacting a specific metal and reaction gas, the layer being formed by a physical evaporation method such as the ion-plating method in such a manner that its electrical resistance increases progressively from the inner surface closest to the valve to the outer surface destined to make contact with the wall of the guide hole.

The layer can be readily formed by a physical evaporation method wherein an ionized metal such as Zr, Cr or Al vaporized from a vapor source is reacted with a reaction gas such as $O_2$, $N_2$ or $C_2H_2$ and the resulting compound is deposited on the surface of the valve. Specifically, this ion-plating method can be carried out while gradually increasing the concentration of the reaction gas to form a layer of gradually increasing electrical resistance.

For example, when zirconium (Zr) is selected as the metal and $O_2$ is selected as the reaction gas, the layer can be formed as follows. The valve is disposed in an evaporation chamber which is then evacuated prior to the formation of the layer. Next, in accordance with the ion-plating method, Zr is evaporated and the resulting Zr ions are deposited on the valve to form a metal (Zr) region. Subsequently, $O_2$ is introduced into the chamber in such manner as to gradually increase the concentration of $O_2$ in the chamber at a prescribed rate. As a result there is formed a transition region of gradually changing composition which varies from a non-stoichiometric compound representable as $ZrO_{2-x}$ to stoichiometric $ZrO_2$ at its outer surface. The amount of oxygen of the layer thus increases from the valve side, i.e. the inner surface, toward the guide hole side, i.e. the outer surface thereof.

Containing little or no oxygen, the region on the valve side adheres very tightly to the metal of the valve. As a result, excellent adherence is obtained between the film layer acting as an insulation layer and the valve.

On the other hand, since the outer surface of the layer is a hard insulating material, the electrical insulation between the body and the valve member can be sufficiently maintained. It is thus possible to realize a layer that is excellent in both insulating property and resistance to abrasion and peeling.

The layer can be formed by the conventional ion-plating method modified only to permit control of the reaction gas concentration, making it easy to produce a layer having excellent hardness and durability.

The invention will be better understood and the other objects and advantages thereof will be more apparent from the following detailed description of preferred embodiments with reference to the accompanying drawings.

DESCRIPTION OF THE PREFERRED EMBODIMENTS

Figure 1:
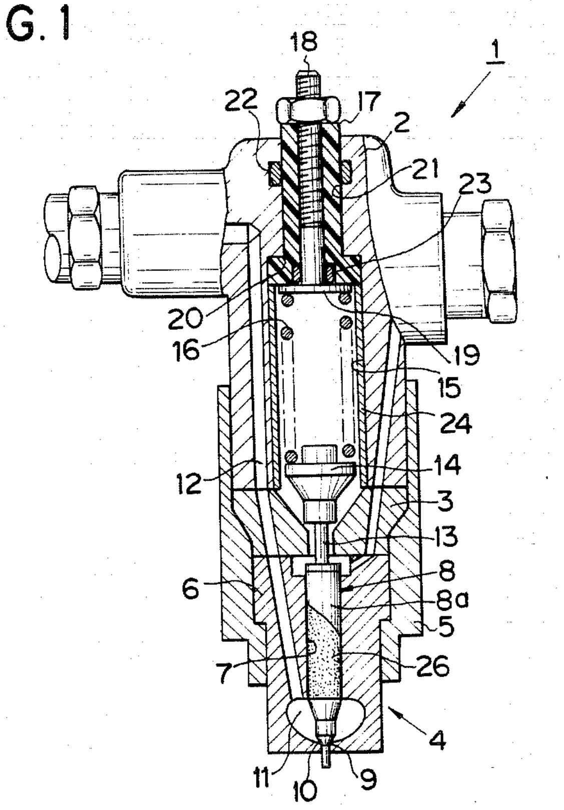
FIG. 1 is a cross sectional view showing an embodiment according to the present invention.

Referring to FIG. 1, a fuel injection valve 1 has a nozzle holder 2, a plate member 3 and a nozzle 4, which are threaded into a sleeve nut 5. The nozzle 4 is composed of a nozzle body 6 and a needle valve 8 received in a guide hole 7 so as to be smoothly slidable therein. A conical member 9 which serves as a valve body is formed at the end portion of the needle valve 8 and a valve seat 10 the shape of which matches the conical member 9 is defined in the nozzle body 6. A chamber 11 is defined in the nozzle body 6 adjacent to the valve seat 10 and the chamber 11 is communicated with a fuel path 12.

The needle valve 8 is made of steel and is electrically connected to a conductive spring seat 14 through a conductive pin 13 when the fuel injection valve 1 is in closed condition.

A coil spring 16 is received in a spring chamber 15 defined in the nozzle holder 2, and one end portion of the coil spring 16 is supported by a shoulder portion 20 formed in the spring chamber 15 via a disc portion 19 formed at the lower end of an electrode 18 inserted into an insulation sleeve 17 in a force-fit condition while the other end of the coil spring 16 is supported by the spring seat 14. The insulation sleeve 17 is provided for insulating the conductive nozzle holder 2 from the electrode 18 and may be inserted into a hole 21 of the nozzle holder 2 snugly or with some clearance. Reference numerals 22 and 23 denote O-rings for maintaining oil-tight condition.

The coil spring 16 is also made from a suitable electrically conductive material such as steel, so that the electrode 18 and the needle valve 8 are in electrically connected condition through the pin 13, the spring seat 14 and the coil spring 16. To prevent the coil spring 16 from coming into electrical connection with the nozzle holder 2 there is provided an insulation sleeve 24, which is especially necessary in a small fuel injection valve because of the small distance between the coil spring 16 and the wall surface of the spring chamber 15. The nozzle body 6, the plate member 3, the sleeve nut 5 and the nozzle holder 2 are also made from electrically conductive materials.

In order to maintain the electrical insulation between the outer surface 8*a* of the larger diameter portion of the needle valve 8 and the inner surface of the guide hole 7 of the nozzle body 6, the needle valve 8 is coated with a thin layer 26 which can be formed as by the ion-plating method.

In this embodiment, the layer 26 is a composition represented by $ZrO_{2-x}$, wherein x varies from zero in the vicinity of the outer surface thereof to 2 in the vicinity of needle valve 8. That is to say, the layer 26 is made of zirconium oxide ($ZrO_2$) in the vicinity of the outer surface thereof, is formed of a Zr compound whose oxygen content $\theta$ gradually decreases inwardly in the intermediate region thereof, and is formed solely of Zr in the vicinity of the needle valve 8. This is graphically represented in FIG. 2 which shows the layer 26 to be composed of only metal (Zr) in the region I from $t=0$ at the surface of the needle vale 8 to $t=t_1$, and of $ZrO_2$ in the region II from $t=t_2$ to $t=t_0$ at the outer surface.

Between the regions I and II is a transition region III defined by $t_1<t<t_2$. In the region III, the layer 26 is composed of a non-stoichiometric compound represented by $ZrO_{2-x}$, where x varies from 2 to 0. As a result, the electrical resistance of the layer 26 becomes progressively higher with increasing distance from the needle valve 8 and increasing proximity to the wall of the guide hole 7.

Figure 2:
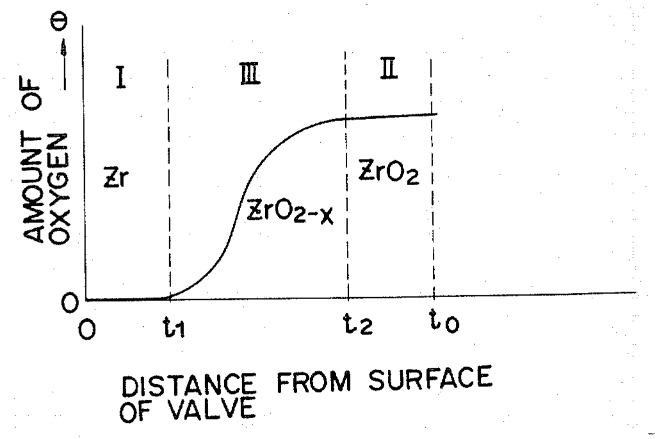
FIG. 2 is a graph indicating the composition of the layer formed on the valve shown in FIG. 1.

When the layer 26 is made to have the structure shown in FIG. 2, the region I, i.e. the metal layer, adheres strongly to the metal of the needle valve 8, while high insulation between the needle valve 8 and the nozzle body 6 and excellent resistance to abrasion are guaranteed by the region II, i.e. the $ZrO_2$ region. Moreover, the regions I and II, which are of different nature, are strongly bonded with each other by the transition region III. Consequently, the layer 26 as a whole has excellent resistance to peeling and abrasion so that there can be realized a fuel injection valve having a switch with excellent durability.

Figure 3:
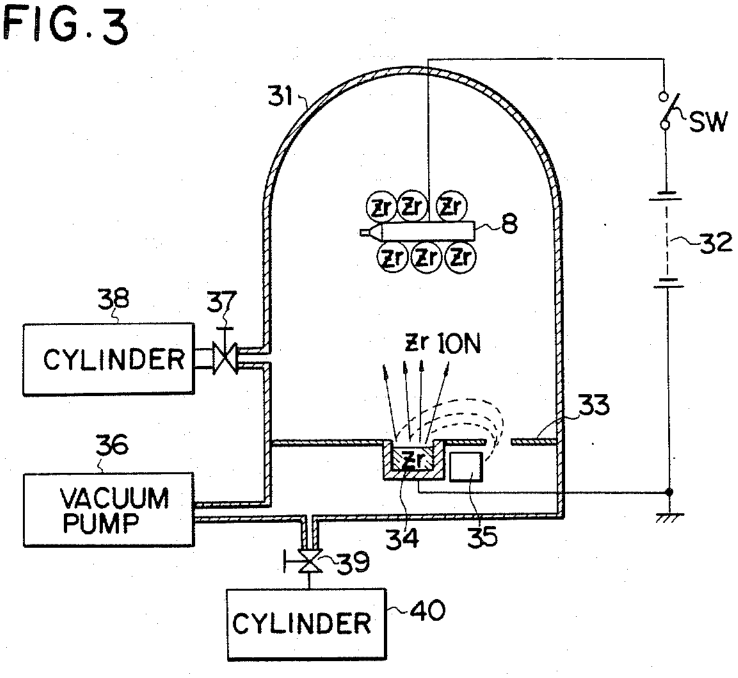
FIG. 3 is a schematic view of the ion-plating unit for forming the layer shown in FIG. 1.

Now, the method of forming a layer 26 of the cross sectional structure shown in FIG. 2 on the surface of the needle valve 8 will be described with reference to FIG. 3.

The needle valve 8 is disposed within a vacuum chamber 31 connected through a switch SW to the negative electrode of a high voltage d.c. source 32. An evaporation source or evaporation vessel 34 is disposed on a partition 33 and connected to the positive electrode of the high voltage d.c. source 32. Within the evaporation vessel 34 is disposed a quantity of Zr which is fused and evaporated by bombardment with electrons from an electron gun 35. The chamber 31 is evacuated and maintained at a prescribed vacuum pressure by a vacuum pump 36.

After the prescribed degree of vacuum has been attained in the vacuum chamber 31, Ar gas is introduced from a cylinder 40 through a valve 39. The switch SW is closed to apply the d.c. voltage between the needle valve 8 and the evaporation vessel 34, causing a glow discharge for cleaning the interior of the chamber 31. After cleaning is finished, the Zr is vaporized and the resulting Zr ions are made to deposit on the surface of the needle valve 8 by the high negative voltage applied to the needle valve 8 at this time.

As a result, the region I formed. Although not illustrated, ionization of the Zr is expedited by the high frequency method or the thermionic method. When the region I has been formed to the prescribed thickness, a valve 37 is opened and oxygen (the reaction gas) is gradually introduced into the vacuum chamber 31 from the cylinder 38. By this operation, the transition region III indicated by $ZrO_{2-x}$ begins to be formed on the region I. The partial pressure of the reaction gas within the vacuum chamber 31 is controlled to increase gradually over time so as to form a transition region III having a gradient of oxygen content as illustrated in FIG. 2. This operation is continued until finally the composition of the deposited material becomes $ZrO_2$, whereby the region II is formed to a predetermined thickness on the transition region III.

In the manner described above, mere control of the partial pressure of the reaction gas enables formation of a layer 26 having the structure shown in FIG. 2 by the use of the conventional ion-plating method.

In the foregoing embodiment, Zr is used as the evaporation material while $O_2$ is used the reaction gas. It is however apparent that the materials for the disposed layer are not limited to these and other non-organic insulating materials may be used instead. Accordingly, Al, Cr, Si or the like may be used as the evaporation material while $N_2$, $C_2H_2$ or the like may be used as the reaction gas.

When the layer 26 is formed by the ion-plating method as described, the processing temperature during the deposition can be lowered, e.g. to less than 550° C., so that the needle valve, which has been heat treated prior to formation of the layer 26, does not develop strain and is not tempered.

In addition, the present invention has an outstanding advantage in that it entails no danger of environmental contamination since the coating process is carried out by the dry system within the vacuum chamber.

The valve unit having a switch according to the present invention is not limited to the embodiment as shown in FIG. 1. The invention can also be applied to, for example, various solenoid valves.

Figure 4:
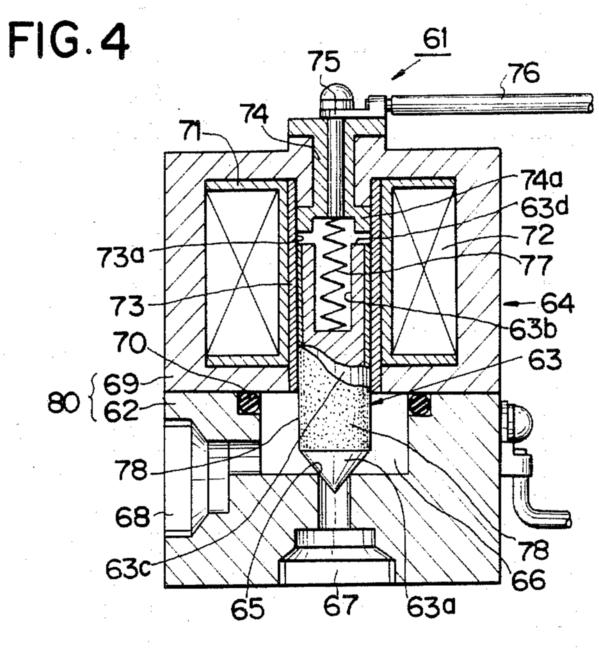
FIG. 4 is a cross sectional view showing another embodiment according to the present invention.

FIG. 4 shows another embodiment wherein the present invention is applied to a solenoid valve. A solenoid valve 61 has a lower casing 62, a valve 63 made of a conductive material such as steel and a driving section 64 which is fixed to the lower casing 62 and electromagnetically drives the valve 63. In the lower casing 62, which is made of a conductive material, there are formed a valve seat 65 on which the valve 63 seats, an outlet port 67 communicated through the valve seat 65 with a chamber 66, and an inlet port 68 communicated with the chamber 66.

An upper casing 69 of the driving section 64 is fixed to the lower casing 62 by an appropriate fixing means (not shown) and liquid tight condition is maintained between the lower casing 62 and the upper casing 69 by an O ring 70 provided therebetween, whereby a case 80 of the solenoid valve 61 is formed. A solenoid coil 72 wound on a bobbin 71 is mounted in the upper casing 69, and the valve 63 is slidably supported and guided by a cylindrical guide member 73 which is made of a non-magnetic metal material, such as brass, and disposed in the center portion of the bobbin 71.

An electrode 75 is fitted through an insulating sleeve 74 into the top end portion of the upper casing 69. One end of the electrode 75 is connected with a lead wire 76 and the other end of the electrode 75 is in contact with an expansion coil spring 77 received in a concave portion 63*b* of the valve 63. The valve 63 is urged downward by the coil spring 77 and the tip portion 63*a* of the valve 63 is pressed onto the valve seat 65 when no driving current flows through the solenoid coil 72 to close the solenoid valve 61. On the other hand, when the driving current flows through and energizes the solenoid coil 72, an electromagnetic force acts on the valve 63 causing it to move upward against the force of the coil spring 77. As a result, the tip portion 63*a* of the valve 63 separates from the valve seat 65 to open the solenoid valve 61.

Since both the valve 63 and the coil spring 77 are made of electrically conductive materials, the electrical contact state between the valve 63 and the electrode 75 can be maintained by the coil spring 77.

To constitute a switch by the valve 63 and the valve seat 65 utilizing the fact that when the solenoid valve 61 closes the valve 63 comes in contact with the valve seat 65 and when it opens the valve 63 separates from the valve seat 65, a thin layer 78 is formed on the outer surface 63*c* of the valve 63 for establishing a non-conductive state between the valve 63 and the guide surface 73*a* of the guide member 73 which is electrically connected with the upper casing 69.

Thus, when the layer 78 is formed on the outer surface 63*c* of the valve 63 to establish the electrically non-conductive state between the guide member 73 and the valve 63, the non-conductive state between the valve 63 and the upper casing 69 can be also established when the solenoid valve 61 is opened so that the valve 63 is separated from the valve seat 65. Therefore, the lower casing 62 is electrically disconnected from the lead wire 76 when the solenoid valve 61 is open. On the other hand, the lower casing 62 is electrically connected with the lead wire 76 when the solenoid valve 61 is closed. That is, a switch is constituted by the valve 63 and the associated valve seat 65 which is turned ON or OFF in response to the open or closed state of the solenoid valve 61.

In this embodiment, a flange portion 74*a* is formed at the lower end portion of the insulating sleeve 74 to prevent the top end surface of the valve 63 from coming in contact with the upper casing 69 when the valve 63 is lifted at the time of energization of the solenoid coil 72. Alternatively, of course, an insulation layer may be provided on the top end surface 63*d* of the valve 63.

The layer 78 on the valve 64 can be formed by the ion-plating method similarly as in the case of the layer 26 shown in FIG. 1. In this embodiment as well, it is possible to realize a thin layer which, thanks to its excellent resistance to peeling and abrasion, has strikingly improved durability.

More specifically, thin layer 78 of the valve 64 is a layer composed of a compound of specific metal and reaction gas and is formed by a physical evaporation method on the outer surface of the valve by the metal region formed of the specific metal. Moreover, the layer is formed so that its electrical resistance increases gradually toward its outer surface. As a result, the outer portion of the layer, which acts as an insulating portion, can be formed as a hard insulating layer having good abrasion resistance while the innermost side of the layer is constituted of the metal region, with the result that the layer tightly adheres to the valve by the metal region, thus realizing an insulating layer having good abrasion and peeling resistance.

As described in the foregoing, since the thin layer can be easily formed by use of a physical evaporation method, a valve unit having a switch function and exhibiting excellent antiabrasion and antipeeling characteristics can be realized at a low manufacturing cost.

Furthermore, according to the invention, the thicknesses of the regions I and II can be appropriately determined so as to realize their respective purposes. Therefore, these thicknesses can advantageously be determined in accordance with the design specifications for each specific value unit.

Consequently, for example, since the insulation resistance at the outermost portion of the transition region can be considered to be substantially the same as that of the region II, in some cases, it may be possible to omit the region II.

Similarly, since the nature of the innermost portion of the transition region III can be considered to be substantially the same as that of the metal region I, it may in some cases be possible to reduce the thickness of the region I to zero.

We claim:

1. In a valve unit having a switch comprising an electrically conductive valve which slidably moves within a guide hole defined in an electrically conductive body and a layer for maintaining an electrically insulated state between said valve and said body for forming a switch wherein an electrically conductive state is established between said valve and said body when said valve is seated on a valve seat associated therewith and an electrically insulated state is established between said valve and said body when said valve is lifted from said valve seat, the improvement wherein said layer is made of three different portions which contain different compositions of a specific metal and a specific reaction gas, said specific metal being selected as having a property as metal of strong adherence to said valve and a property as a compound of the metal and the gas of being electrically insulating, wherein a first portion is disposed as an inner surface of said layer closer to said valve which is composed substantially of said metal, a second portion is disposed as an outer surface of said layer which is composed of an insulating compound of said metal and said gas, and a third portion is disposed as the region in between said inner and outer surfaces which is composed of a non-stoichiometric compound of said metal and said gas which varies progressively in the direction of thickness of said third portion from substantially the metal composition at said inner surface to the insulating compound composition at said outer surface so as to strongly bind said first portion of said layer to said second portion thereof, and said layer is coated on the peripheral surface of said valve such that said metal composition of said inner surface of said layer forms a strongly adhering bond to the surface of said valve and said outer surface of said layer forms an electrically insulating surface destined to make insulating contact with the wall of said guide hole.

2. A valve unit as claimed in claim 1 wherein the innermost surface of said layer is formed of the specific metal.

3. A valve unit as claimed in claim 2 wherein said layer has a transition region whose electrical resistance varies progressively in the direction of thickness and a metal region of prescribed thickness formed of the specific metal.

4. A valve unit as claimed in claim 3 wherein said layer further comprises an insulating region of a prescribed thickness on the outermost surface of the transition region, said insulation region being formed of the complete compound obtained by reacting the specific metal and the specific reaction gas.

5. A valve unit as claimed in claim 1 wherein the outermost surface of said layer is formed of the complete compound obtained by reacting the specific metal and the specific reaction gas.

6. A valve unit as claimed in claim 5 wherein the innermost surface of said layer is formed of the specific metal.

7. A valve unit as claimed in claim 6 wherein the intermediate portion of said layer between the outer and inner surfaces is formed of non-stoichiometric compound of the specific metal and the specific reaction gas.

8. A valve unit as claimed in claim 7 wherein said metal is one member selected from the group consisting of Zr, Cr and Al.

9. A valve unit as claimed in claim 7 wherein said specific reaction gas is one member selected from the group consisting of $O_2$, $N_2$ and $C_2H_2$.

* * * * *